3,483,249
PRODUCTION OF 2-ALKYL-2-METHYL-3-HYDROXYPROPIONIC ACIDS
Rolf Platz, Mannheim, Germany, assignor to Badische Anilin- & Soda-Fabrik Aktiengesellschaft, Ludwigshafen (Rhine), Germany
No Drawing. Continuation of application Ser. No. 459,455, May 27, 1965. This application Feb. 12, 1968, Ser. No. 704,945
Claims priority, application Germany, June 3, 1964, B 77,054
Int. Cl. C07c 51/26
U.S. Cl. 260—530                                   2 Claims

ABSTRACT OF THE DISCLOSURE

A process for the production of 2-alkyl-2-methylhydroxypropionic acids by oxidizing a 2-alkyl-2-methyl-3-hydroxypropanal-(1) with oxygen at temperatures ranging from 50° to 150° C. and at pressures between 20 and 100 atmospheres.

---

This is a continuation of Ser. No. 459,455 filed May 27, 1965.

This invention relates to a process for the production of 2-alkyl-2-methyl-3-hydroxypropionic acids by oxidation of 2-alkyl-2-methyl-3-hydroxypropanal-(1).

It is known that 2,2-dimethyl-3-hydroxypropionic acid (hydroxypivalic acid) may be prepared from 2,2-dimethyl-3-hydroxypropanal-(1) by oxidation with potassium permanganate or—in addition to the diol—by disproportionation by means of the Cannizzaro reaction. Like the direct oxidation of the aldehyde with oxygen in the presence of cobalt catalysts, these reactions proceed with only poor yields, mainly because the aldehyde is normally present as the dimer and in this form cannot be oxidized directly; in the case of the Cannizzaro reaction, the yields will not exceed 50%.

It is therefore surprising that 2-alkyl-2-methyl-3-hydroxypropionic acids are obtained from 2-alkyl-2-methyl-3-hydroxypropanals-(1) when solutions of 2-alkyl-2-methyl-3-hydroxypropanals-(1) are reacted at elevated temperature with oxygen or a mixture of oxygen with an inert gas.

A particular advantage of the new process is its simplicity, and another advantage is the very good yields achieved therewith at high conversions. Moreover, the new process permits the production not only of hydroxypivalic acid, but in the same way also higher homologs thereof which bear in 2-positions an alkyl having more than one carbon atom, thus widening the range of organic intermediates which can be obtained in a simple way and which can be used for example for the production of plastics.

3-hydroxy-2-alkyl-2-methylpropanals - (1) in dissolved form may be used as initial materials for the new process. The alkyl groups in the starting materials may be linear or branched and may contain substituents which are inert under the reaction conditions. Those compounds are particularly suitable whose alkyl groups contain up to about four carbon atoms. The concentration of the solutions in which these substances are used may vary within wide limits; the concentration range of 10 to 30% by weight, preferably that of 15 to 20% by weight, has proved to be particularly suitable. The preferred solvent is water.

The temperatures may also vary within a relatively wide range, namely from about 50° to 150° C.; the temperature range of from 70° to 130° C. is particularly useful. Even slightly increased pressure of oxygen or oxygen-containing gas accelerates the reaction. The preferred pressure range is from 20 to 100 atmospheres gauge. It may be mixed with gases which are inert under the reaction conditions, e.g., nitrogen, methane or carbon monoxide. Other inert substances may be used additionally, no claim being made herein to the use of catalysts.

The reaction periods are in general one half hour to several hours, particularly one to five hours. A particularly simple embodiment of the reaction consists in keeping the solutions of the starting materials in an autoclave at elevated temperature and under a pressure of oxygen or gas containing oxygen. The procedure may however be that gas is supplied over part or the whole of the reaction period, in the latter case until there is no further absorption of oxygen by the reaction mixture.

The reaction mixture may be worked up by extraction with solvents, for example with ether, which dissolve the starting material and any by-products which may have been formed, by evaporation of the aqueous phase and if desired, by fractional distillation of the residue remaining. If the hydroxycarboxylic acid obtained is to be purified, it may be recrystallized from ether or chloroform. Excellent yields amounting to about 49 to 76% of the theory at conversions of 85 to 90% are obtained.

3-hydroxy-2-alkyl-2-methylpropionic acids obtained by the new process may be used as intermediates, particularly for the production of valuable polymers.

The invention is further illustrated by the following examples. The parts specified in the examples are parts by weight.

EXAMPLE 1

100 atmospheres gauge of oxygen is forced into a solution of 200 parts of 2,2-dimethyl-3-hydroxypropanal-(1) in 1000 parts of water at an internal temperature of 80° C. in a shaker autoclave, and the autoclave is shaken for two hours. The autoclave is then cooled and released from pressure. The reaction product is extracted for 24 to 36 hours in a Schacherl extractor with diethyl ether, the water is evaporated and 155 parts of crystallized hydroxypivalic acid having a melting point of 123° C. is obtained. 22.6 parts of 2,2-dimethyl-3-hydroxypropanal-(1) can be recovered from the etheral extract. Conversion is 88.7% and the yield is 75.5% of the theory.

EXAMPLE 2

A shaker autoclave containing a solution of 100 parts of 2-methyl-2-ethyl-3-hydroxypropanol-(1) in 500 parts of water at an internal temperature of 100° C. is pressured with oxygen to 130 atmospheres gauge. The autoclave is shaken for six hours under these conditions and is then cooled and released from pressure. 79 parts of the hydroxycarboxylic acid is obtained by distillation at 4 mm. Hg and 130° C. The melting point is 53° to 54° C. The yield is 69.2% of the theory at 100% conversion.

EXAMPLE 3

A solution of 200 parts of 2,2-dimethyl-3-hydroxypropanal-(1) in 1000 parts of water is heated to 90° C. in a tube whose bottom surface consists of a fritted glass disk and which is fitted with a reflux condenser and a separator. 60 litres per hour of oxygen is then passed in through the fritted disk, the amount of gas supplied and the amount of off-gas being measured through calibrated orifice plates which are located before and behind the reactor. Absorption of oxygen has ceased after about 130 minutes. The reaction mixture is then freed from water by evaporation and the residue is distilled at a pressure of 15 mm. Hg. 36 parts of 2,2-dimethyl-3-hydroxypropanal-(1) distills over at 90° to 95° C., and 93.6 parts of hydroxypivalic acid distils over at 115° to 120° C. This is a yield of 49.3% of the theory at a conversion of 82%.

EXAMPLE 4

A solution of 100 parts of 2,2-dimethyl-3-hydroxypropanal-(1) is heated to 95° C. in an autoclave provided with a high speed stirrer. Air is then supplied at a pressure of 12 atmospheres gauge at the rate of 70 liters per hour (measured at 1 atmosphere gauge). The concentrations of oxygen in the gas introduced and in the off-gas are equal after 330 minutes. The reaction product is distilled. 12.7 parts of 2,2-dimethyl-3-hydroxypropanal-(1) and 54.8 parts of hydroxypivalic acid are obtained. Conversion is 87.3% and the yield is 54.3% of the theory.

I claim:
1. A process for the production of 2-alkyl-2-methyl-3-hydroxypropionic acids wherein a solution containing 10 to 30% by weight of a 2-alkyl-2-methyl-3-hydroxypropanal-(1) whose alkyl group contains up to 4 carbon atoms is reacted at temperatures between 50° and 150° C. and pressures between 20 and 100 atmospheres gauge with oxygen, the molar ratio of oxygen to said starting material being from 2:1 to 5:1.
2. A process for the production of 2,2-dimethyl-3-hydroxypropionic acid wherein an aqueous solution containing 10 to 30% by weight of 2,2-dimethyl-3-hydroxypropanal-(1) is reacted at temperatures between 70° and 130° C. and pressures between 20 and 100 atmospheres gauge with oxygen, the molar ratio of oxygen to said starting material being from 2:1 to 5:1.

References Cited

UNITED STATES PATENTS

| 3,287,400 | 11/1966 | Hagemeyer et al. |
| 2,437,410 | 3/1948 | Tuerck et al. |

OTHER REFERENCES

Hagemeyer: "The Chemistry of Isobutyroldehyde and Its Derivatives," 1953, p. 20.

LORRAINE A. WEINBERGER, Primary Examiner

D. E. STENZEL, Assistant Examiner

U.S. Cl. X.R.
260—535